Patented Feb. 12, 1935

1,991,329

UNITED STATES PATENT OFFICE 1,991,329

ALKALI-METAL TRICHLOROPHENOLATES

Lindley E. Mills, Midland, Mich., assignor to The Dow Chemical Company, Midland, Mich., a corporation of Michigan No Drawing. Application May 2, 1932, Serial No. 608,855

2 Claims. (Cl. 260—154)

The present invention regards a new class of compounds, namely, the alkali metal 2,4,5-trichlorophenolates. The said phenolates, so far as I am aware, have not been previously prepared and/or isolated, nor have the properties thereof been described.

I have now prepared the aforementioned compounds, determined certain physical properties thereof whereby they may readily be identified, and have discovered that they may advantageously be used as fungicides, antiseptics, preservatives, etc. To the accomplishment of the foregoing and related ends, the invention, then, consists of the new products, hereinafter fully described and particularly pointed out in the claims, the following description setting forth in detail several of the various ways in which the principle of the invention may be realized.

I have found that the phenolates of 2,4,5-trichlorophenol can be formed with the alkali metals, i. e. lithium, sodium, potassium. The method which I generally employ for the preparation of the aforementioned phenolates comprises adding 2,4,5-trichlorophenol to an aqueous solution or suspension of an alkali metal hydroxide, maintaining the mixture at the proper reaction temperature for a suitable period of time, and cooling the reaction product whereby hydrated crystals of the phenolates are obtained.

In carrying out the foregoing method for the preparation of the various alakli metal trichlorophenolates, the compounds are obtained directly by crystallization in a hydrated form, generally the pentahydrate. However, upon exposure to the air at ordinary room temperatures the pentahydrate compounds lose about 4 molecules of water of crystallization. The resultant monohydrate may then be readily dehydrated to the anhydrous compounds, such as by heating them to a temperature between 40° and 60° C. at atmospheric pressure, or by drying in vacuo over sulphuric acid or calcium chloride at room temperature. The compounds are white, crystalline substances which do not melt, but decompose at varying temperatures upon heating; e. g. the sodium salt decomposes at 280° C. The compounds are partially decomposed in aqueous solution by carbon dioxide with the formation of the metal carbonates and trichlorophenol. The alkali metal phenolates are soluble in water, alcohol and acetone. The probable structural formula of the alkali metal phenolates is:—

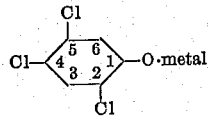

I will now describe in detail one method of preparing a specific alkali metal trichlorophenolate, namely, the pentahydrated sodium 2,4,5-trichlorophenolate.

Example 1

The aforesaid compound was prepared by dissolving 81.6 grams (2 mols.) of 98 per cent sodium hydroxide in 144 grams (8 mols.) of water, adding 295 grams (2 mols.) of 2,4,5-trichlorophenol to the warm solution, and agitating the mixture. The heat liberated by the reaction was sufficient to raise the temperature of the mixture to between 80° and 100° C., at which temperature the sodium trichlorophenolate formed during the reaction was maintained in solution. The mixture was allowed to cool as rapidly as the heat of reaction was dissipated and at a temperature slightly below 80° C. crystals began to form. At 45° to 46° C. the temperature of the reaction product remained constant while the entire mass crystallized. The yield of sodium trichlorophenolate pentahydrate crystals was 618 grams, or above 99 per cent of the theoretical yield obtainable. The product, sodium 2,4,5-trichlorophenolate pentahydrate, is soluble in water, alcohol and acetone. Upon exposure to air at ordinary room temperature 4 molecules of water of crystallization are lost, and upon drying in vacuo over sulphuric acid or calcium chloride at room temperature, or at atmospheric pressure at a temperature of 40° to 60° C., 5 moles of water of crystallization are lost and the anhydrous compound is obtained. The anhydrous phenolate is a white substance which decomposes at 280° C.

The lithium and potassium phenolates may also readily be prepared in the manner just described as applicable for the preparation of the sodium compound.

Upon analysis, the theoretical percentage of alkali metal was found in each of the foregoing described phenolates, and the correct amount of 2,4,5-trichlorophenol can be obtained in each case by acidifying the said phenolates and boiling the acid solution. The aqueous solutions of the hereinbefore mentioned class of new compounds may be more advantageously used as fungicides, etc., than free trichlorophenol, because of their greater solubility in water as compared with the free phenol.

Other modes of applying the principle of my invention may be employed instead of the one explained, change being made as regards the method and products herein disclosed, provided the step or steps stated by any of the following claims or the equivalent of such stated step or steps be employed.

I therefore particularly point out and distinctly claim as my invention:—

1. Crystalline sodium 2,4,5-trichlorophenolate.
2. A crystalline alkali metal 2,4,5-trichlorophenolate.

LINDLEY E. MILLS.